(12) United States Patent
Charles et al.

(10) Patent No.: US 10,699,333 B2
(45) Date of Patent: Jun. 30, 2020

(54) ONLINE BIDDING SYSTEM

(71) Applicant: Invaluable, LLC, Boston, MA (US)

(72) Inventors: David J. Charles, Arlington, MA (US); Michael L. Kaplan, Somerville, MA (US); Michael A. Greenstein, Acton, MA (US); Elizabeth Beiriger, Watertown, MA (US)

(73) Assignee: Invaluable, LLC, Boston, MA (US)

( * ) Notice: Subject to any disclaimer, the term of this patent is extended or adjusted under 35 U.S.C. 154(b) by 246 days.

(21) Appl. No.: 15/996,006

(22) Filed: Jun. 1, 2018

(65) Prior Publication Data

US 2018/0276743 A1 Sep. 27, 2018

Related U.S. Application Data

(63) Continuation-in-part of application No. 14/575,269, filed on Dec. 18, 2014, now Pat. No. 9,996,875.

(60) Provisional application No. 61/917,447, filed on Dec. 18, 2013.

(51) Int. Cl.
*G06Q 30/00* (2012.01)
*G06Q 30/08* (2012.01)
*G06Q 20/40* (2012.01)

(52) U.S. Cl.
CPC ............ *G06Q 30/08* (2013.01); *G06Q 20/40* (2013.01)

(58) Field of Classification Search
CPC ................................................ G06Q 30/06–08
USPC ................................................ 705/26.1–27.2
See application file for complete search history.

(56) References Cited

U.S. PATENT DOCUMENTS

2018/0012293 A1* 1/2018 Jain ........................ G06N 5/003

* cited by examiner

*Primary Examiner* — Ethan D Civan
(74) *Attorney, Agent, or Firm* — Mark H. Whittenberger; Holland & Knight LLP

(57) ABSTRACT

A method and computer program product is provided for an online bidding system. The method may include receiving a plurality of bids from a plurality of online bidding communities during a live auction event at one of a primary technology provider and a relying technology provider, wherein the live auction event simultaneously occurs on a physical auction floor and virtually. The method may also include processing the plurality of bids at the primary technology provider. The method may further include providing the processed plurality of bids to a single designated clerking console associated with the primary technology provider for the live auction event. The method may also include receiving an accepted bid from the single designated clerking console.

20 Claims, 6 Drawing Sheets

ONLINE BIDDING SYSTEM

CROSS-REFERENCE TO RELATED APPLICATION

This application is a Continuation-in-Part of U.S. application Ser. No. 14/575,269, filed 18 Dec. 2014, which claims the benefit of U.S. Provisional Application Ser. No. 61/917,447, filed 18 Dec. 2013, of which the entire contents are incorporated herein by reference.

TECHNICAL FIELD

This disclosure relates to an online bidding service and, more particularly, to an online bidding service during a live auction event.

BACKGROUND

Live auction events hosted by an auction house may be held on a physical auction floor and virtually online so that bidders that cannot be physically present at the auction house and/or auction floor may still participate and bid on items over the internet. Many different websites may provide and support discrete online bidding systems.

SUMMARY OF DISCLOSURE

According to an implementation, a method may include receiving, via the one or more computing devices, a plurality of bids from a plurality of online bidding communities during a live auction event at one of a primary technology provider and a relying technology provider, wherein the live auction event simultaneously occurs on a physical auction floor and virtually. The method may also include processing, via the one or more computing devices, the plurality of bids at the primary technology provider. The method may further include processing, via the one or more computing devices, the plurality of bids at the primary technology provider. The method may also include providing, via the one or more computing devices, the processed plurality of bids to a single designated clerking console associated with the primary technology provider for the live auction event.

One or more of the following features may be included. If at least one bid of the plurality of bids is received at the relying technology provider from at least one bidder of the plurality of online bidding communities, the method may further include receiving, at the primary technology provider, the at least one bid from the relying technology provider. The method may also include receiving, at one of the primary technology provider and the relying technology provider, an absentee bid from at least one bidder of the plurality of online bidding communities prior to the live auction event. The absentee bid may include a maximum bid. The method may also include providing the absentee bid to the single designated clerking console for the live auction event. The primary technology provider may include a relying partner trust gateway to authenticate communication from the relying technology provider and provide communication to the relying technology provider. The plurality of bids may be evaluated at the single designated clerking console in real-time with other bids during the live auction event. The method may also include providing the accepted bid from the primary technology provider to the relying technology provider. The method may further include notifying the plurality of bidding communities of the accepted bid. The method may also include processing, at the primary technology provider, post-sale settlement data associated with the accepted bid.

In another implementation, a computer program product resides on a computer readable medium and has a plurality of instructions stored on it. When executed by a processor, the instructions cause the processor to perform operations including receiving a plurality of bids from a plurality of online bidding communities during a live auction event at one of a primary technology provider and a relying technology provider, wherein the live auction event simultaneously occurs on a physical auction floor and virtually. Operations may also include processing the plurality of bids at the primary technology provider. Operations may further include providing the processed plurality of bids to a single designated clerking console associated with the primary technology provider for the live auction event. Operations may also include receiving an accepted bid from the single designated clerking console.

One or more of the following features may be included. If at least one bid of the plurality of bids is received at the relying technology provider from at least one bidder of the plurality of online bidding communities, operations may include receiving, at the primary technology provider, the at least one bid from the relying technology provider. Operations may also include receiving, at one of the primary technology provider and the relying technology provider, an absentee bid from at least one bidder of the plurality of online bidding communities prior to the live auction event. The absentee bid may include a maximum bid. Operations may also include providing the absentee bid to the single designated clerking console for the live auction event. The primary technology provider may include a relying partner trust gateway to authenticate communication from the relying technology provider and provide communication to the relying technology provider. The plurality of bids may be evaluated at the single designated clerking console in real-time with other bids during the live auction event. Operations may also include providing the accepted bid from the primary technology provider to the relying technology provider. Operations may further include notifying the plurality of bidding communities of the accepted bid. Operations may also include processing, at the primary technology provider, post-sale settlement data associated with the accepted bid.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Figure 1:
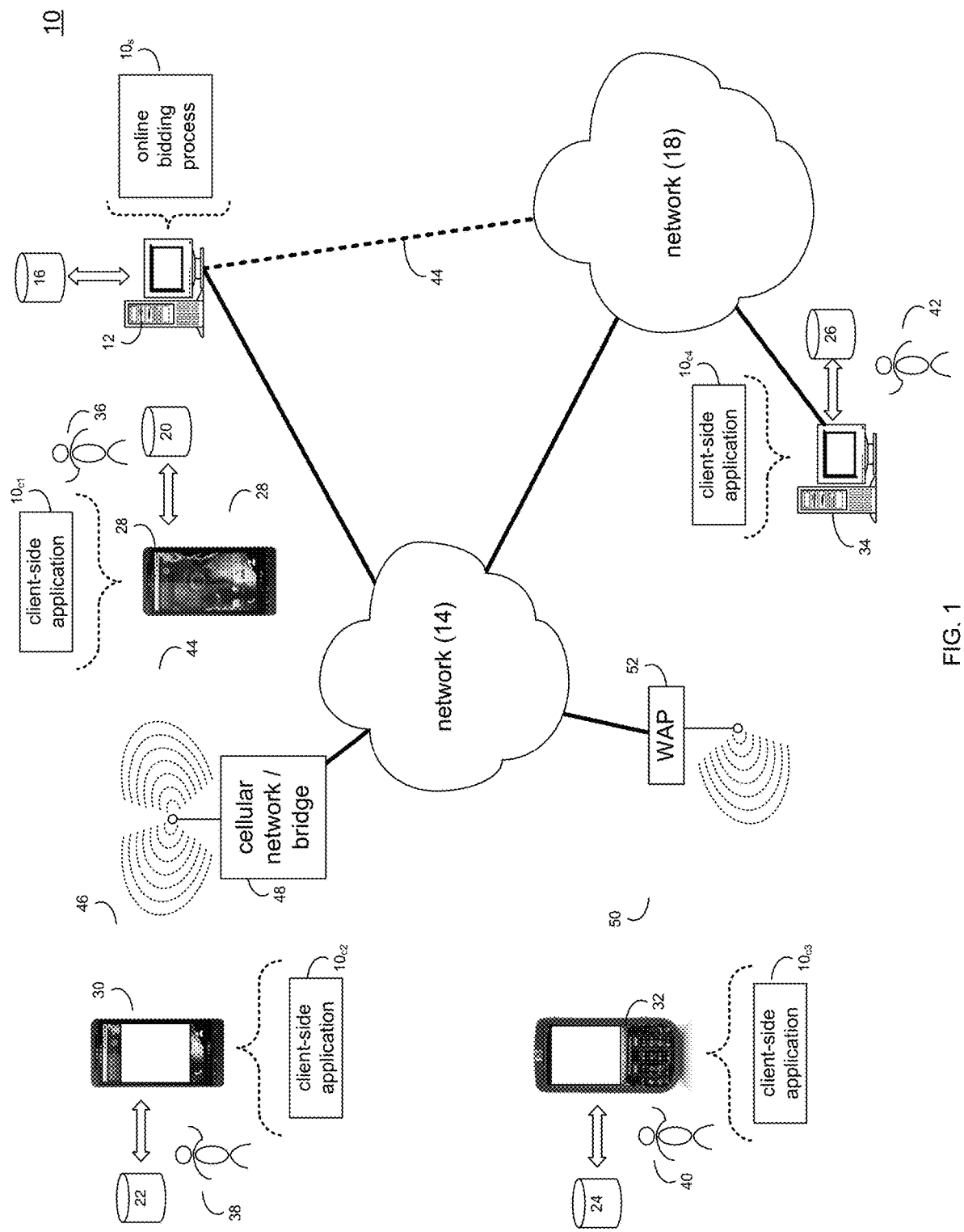
FIG. 1 is a diagrammatic view of a computing network including a computing device that executes an online bidding process.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown online bidding process 10. Online bidding process 10 may be implemented as a server-side process, a client-side process, or a hybrid server-side/client-side process. For example, online bidding process 10 may be implemented as a purely server-side process via online bidding process 10s. Alternatively, online bidding process 10 may be implemented as a purely client-side process via one or more of client-side application 10c1, client-side application 10c2, client-side application 10c3, and client-side application 10c4. Alternatively still, online bidding process 10 may be implemented as a hybrid server-side/client-side process via online bidding process 10s and a combination of one or more of client-side application 10c1, client-side application 10c2, client-side application 10c3, and client-side application 10c4. Accordingly, online bidding process 10 as used in this disclosure may include any combination of online bidding process 10s, client-side application 10c1, client-side application 10c2, client-side application 10c3, and client-side application 10c4.

Online bidding process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a server computer, a series of server computers, a mini computer, a mainframe computer, or a dedicated network device.

The instruction sets and subroutines of online bidding process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., a game application running on a platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephones 28, 30, personal digital assistant 32, personal computer 34, a laptop computer (not shown), a notebook computer (not shown), a server computer (not shown), a gaming console (not shown), and a dedicated network device (not shown).

Users 36, 38, 40, 42 may access online bidding process 10 directly through network 14 or through secondary network 18. Further, online bidding process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephones 28, 30 are shown wirelessly coupled to network 14 via wireless communication channels 44, 46 (respectively) established between data-enabled, cellular telephones 28, 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection. In some embodiments, networks 14 and 18 may include, or may be associated with, those associated with respective relying technology providers (e.g., such as eBay, Amazon, etc.) as is discussed in further detail herein. WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 28, 30, 32, 34 may each execute an operating system, examples of which may include but are not limited to Microsoft Windows™, Android™, WebOS™, iOS™, Redhat Linux™, or a custom operating system.

Figure 2:
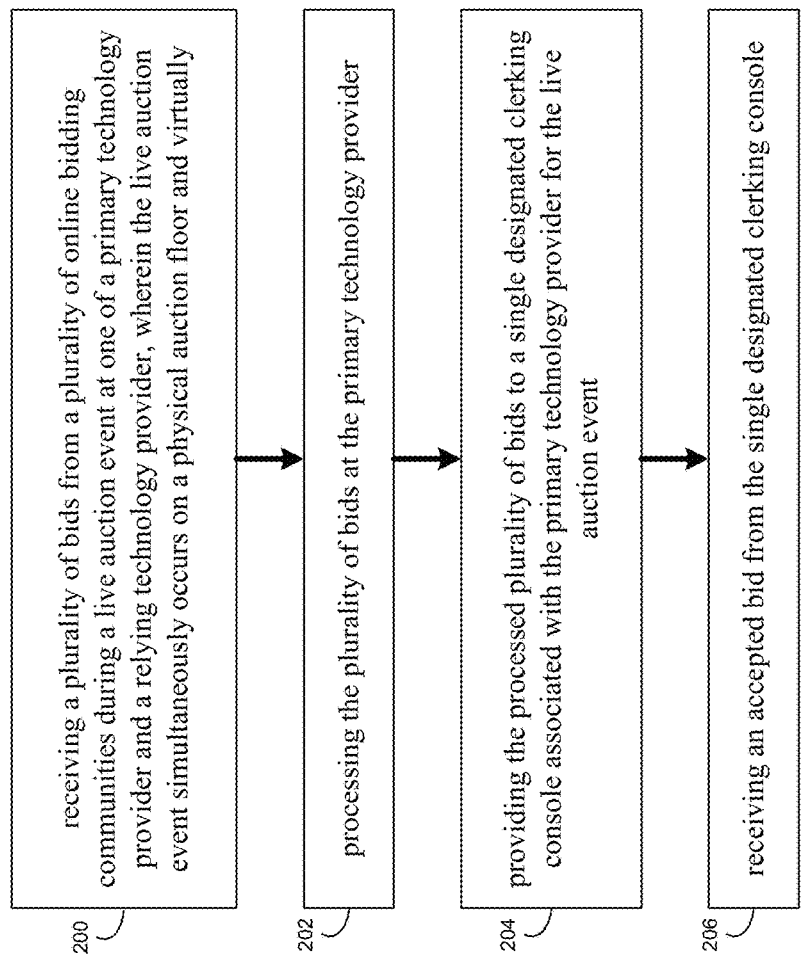
FIG. 2 is a diagrammatic view of a flowchart depicting operations consistent with an embodiment of the online bidding process of FIG. 1.
Figure 3:
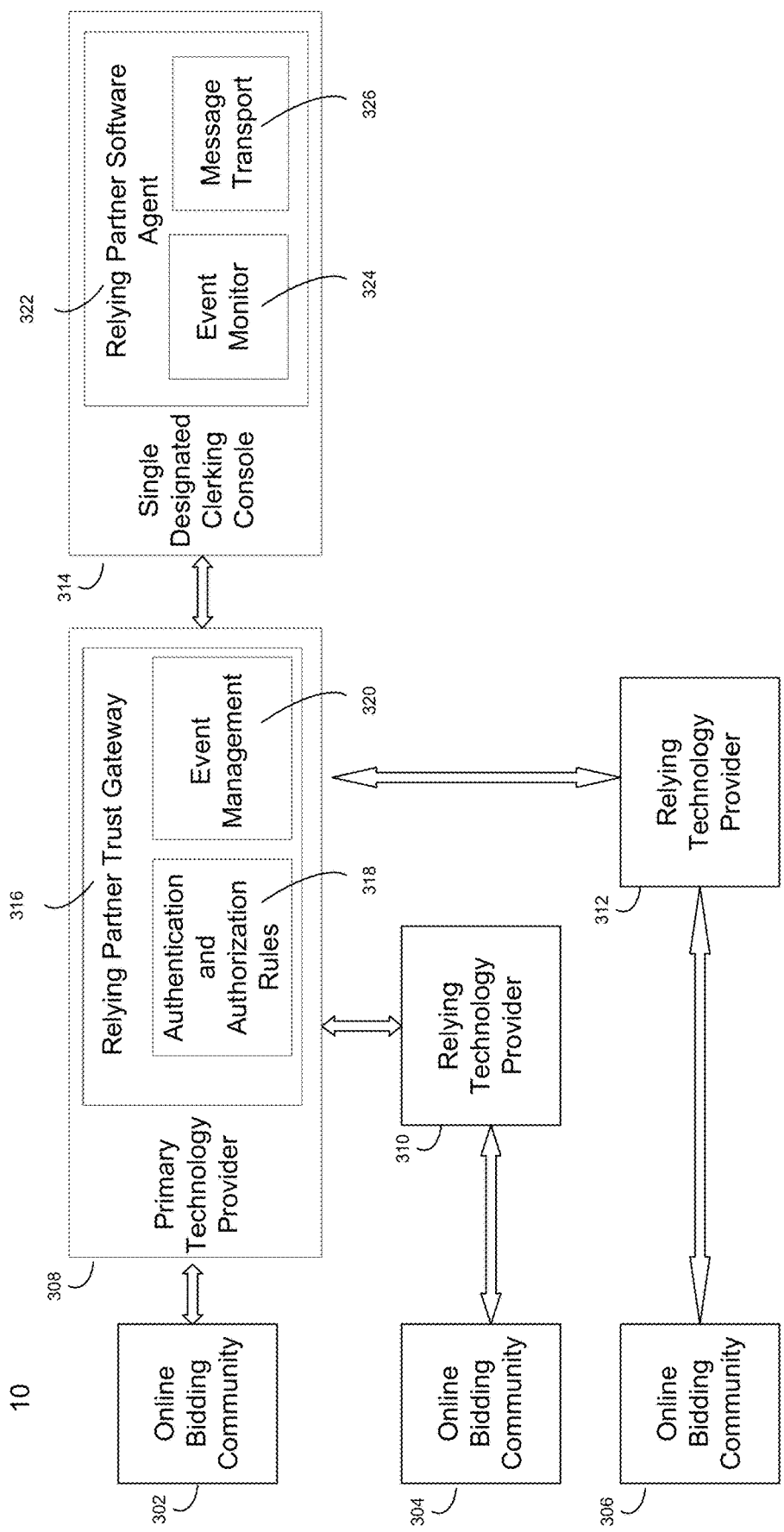
FIG. 3 is diagrammatic representation of an example online bidding process of FIG. 1, according to an implementation of the present disclosure.

Online Bidding Process:

With references to FIGS. 2 and 3, online bidding process 10 may receive 200 a plurality of bids from a plurality of online bidding communities during a live auction event at one of a primary technology provider and a relying technology provider, wherein the live auction event simultaneously occurs on a physical auction floor and virtually. Online bidding process 10 may also process 202 the plurality of bids at the primary technology provider. Online bidding process 10 may also provide 204 the processed plurality of bids to a single designated clerking console associated with the primary technology provider for the live auction event. Online bidding process 10 may further receive 206 an accepted bid from the single designated clerking console.

In some embodiments, online bidding process 10 may receive 200 a plurality of bids from a plurality of online bidding communities during a live auction event at one of a primary technology provider and a relying technology provider, wherein the live auction event simultaneously occurs on a physical auction floor and virtually. Live auction events may occur in different geographical, physical locations around the world. A live auction event may include simulcast events that allow people to remotely bid for items online at the same time as bidders on an auction floor, despite where the auction floor and/or auction house may be geographically located. Primary technology provider 308 and relying technology providers 310, 312 may each provide and host a discrete online bidding platform to allow bidders included within their associated online bidding community (e.g., online bidding communities 302, 304, 306) to bid for items during the live auction event. Each of the plurality of online bidding communities 302, 304, 306 may include at least one bidder. Each online bidding community 302, 304, 306 may be associated with one of primary technology provider 308 and relying technology providers 310, 312. For example, online bidding community 302 may be associated with primary technology provider 308. Online bidding community 304 may be associated with relying technology provider 310. Online bidding community 306 may be associated with relying technology provider 312. Any number of relying technology providers and corresponding online bidding communities may be present during the live auction event. Relying technology providers 310, 312 may include, but are not limited to, e-commerce sites such as eBay™, Amazon™, etc., each of which may offer a different discrete online bidding platform for each of their consumers (e.g., online bidding communities 304, 306). These sites are presented merely by way of example, as numerous different types of relying technology providers are within the scope of the present disclosure.

In some embodiments, an auction house may open bidding live simultaneously on an auction floor, as well as virtually to the plurality of online bidding communities 302, 304, 306 via the plurality of discrete online bidding platforms associated with each of primary technology provider 308 and relying technology providers 310, 312. In this way, the auction house may receive bids from the highest number of bidders possible. Online bidding process 10 may receive 200 the plurality of bids from any of client devices 28, 30, 32, and 34 associated with users 36, 38, 40, and 42 over network 14, 18. Users 28, 30, 32, and 34 may be included within any of the plurality of online bidding communities (e.g., online bidding communities 302, 304, 306).

If at least one bid of the plurality of bids is received at the relying technology provider from at least one bidder of the plurality of online bidding communities, online bidding process 10 may receive, at the primary technology provider, the at least one bid from the relying technology provider. For example, if at least one bid is received 200 at one of relying technology providers 310, 312 from at least one bidder within one of the plurality of online bidding communities (e.g., online bidding communities 304, 306) primary technology provider 308 may receive the at least one bid from relying technology providers 310, 312. In this way, primary technology provider 308 may receive 200 the plurality of bids from each of the plurality of online bidding communities (e.g., online bidding communities 302, 304, 306), either directly from online bidding community 302 or from relying technology providers 310, 312.

Online bidding process 10 may receive, at one of the primary technology provider and the relying technology provider, an absentee bid from at least one bidder of the plurality of online bidding communities prior to the live auction event. An absentee bid may be a bid placed before the live auction event begins. For example, a bidder included within one of online bidding communities 302, 304, 306 may wish to bid on an item during the live auction event, but may not be readily available at the time of the live auction event. Accordingly, the bidder may submit an absentee bid in his or her absence prior to the live auction event beginning. Absentee bids may not be received once the live auction event begins. At the time the live auction event begins, a bidder associated with the absentee bid may join the live auction event online and begin bidding in real-time.

In some embodiments, the absentee bid may include a maximum bid. The maximum bid may be the maximum amount of money the bidder is willing to bid on an item during the live auction event. If the absentee bid is received at one of relying technology providers 310, 312, primary technology provider 308 may receive the absentee bid from the relying technology provider that originally received the absentee bid (e.g., relying technology providers 310, 312), such that all absentee bids are received by primary technology provider 308, either directly from the plurality of online bidding communities (e.g., online bidding communities 302, 304, 306) or from relying technology providers 310, 312.

In some embodiments, online bidding process 10 may process 202 the plurality of bids at the primary technology provider. Once the plurality of bids, including all absentee bids and bids submitted during the live auction event, are received 200 at primary technology provider 308, online bidding process 10 may process 202 the plurality of bids at primary technology provider 308. Each bid received 200 at technology provider 308 may be a secure electronic transmission including identifying information associated with the bidder. This information may include but is not limited to, bidder identity, bid amount, auction house, specific lot information, etc.

In some embodiments, processing 202 the plurality of bids at the primary technology provider may include authenticating the plurality of bids. Accordingly, the primary technology provider may include a relying partner trust gateway to authenticate communication from the relying technology provider and provide communication to the relying technology provider. Relying partner trust gateway 316 may include authentication and authorization rules 318 and event management 320. Primary technology provider 308 may receive at least one bid of the plurality of bids from one of relying technology providers 310, 312 via relying partner trust gateway 316. Relying partner trust gateway 316 may inspect each secure electronic transmission associated with each bid received from relying technology providers 310, 312 to ensure that the identity of relying technology providers 310, 312 is valid and that relying technology providers 310, 312 are authorized to interact with relying partner trust gateway 316. Authentication of relying technology provider 308 may be granted based on a series of industry standard rules and appropriate event management functions may be initiated. Some event management functions may include, but are not limited to, token-based authentication, identification-based hashed key sequences, any federated identity suite (commercial or otherwise), along with any additional IP-based or geographic rules, policies, and/or restrictions applied exclusively or in conjunction with those named above.

In some embodiments, online bidding process 10 may provide 204 the processed plurality of bids to a single designated clerking console associated with the primary technology provider for the live auction event. Providing 204 the processed plurality of bids to a single designated clerking console associated with the primary technology provider for the live auction event may also include providing the absentee bid to the single designated clerking console for the live auction event. Single designated clerking console 314 may be hosted by primary technology provider 308. As each of the plurality of bids are received 200 and processed 202 by primary technology provider 308, primary technology provider 308 may asynchronously provide 204 the processed plurality of bids to single designated clerking console 314 associated with primary technology provider 308 in real-time during the live auction event.

For example, a live auction event may begin with an opening price. The opening price may include a reserve (limit) and bids may be increased by pre-determined monetary increments. Absentee bids may remain confidential until processed and provided by primary technology provider 308 to single designated clerking console 314. An item may have an opening price of $400 with a reserve of $600 and bid increments of $100. Primary technology provider 308 may have received an absentee bid for $700 from a bidder included within online bidding community 302 (or online bidding communities 304, 306 via relying technology providers 310, 312) prior to the live auction event beginning. The absentee bid of $700 may be the maximum bid the bidder chooses to bid on the item. When the live auction event begins, if the item opens at $400, primary technology provider 308 may provide the processed absentee bid at $500 to single designated clerking console 314. Since the absentee bid is a maximum of $700, online bidding process 10 may automatically increment bids for the absentee bidder by the pre-determined monetary increments until the bidder has successfully won the item during the live auction event or until bidding has reached the maximum bid associated with the absentee bidder (e.g., $700). In this manner, primary technology provider 308 may continue to asynchronously provide 204 the processed plurality of bids to single designated clerking console 314 as the bids are received 200 and processed 202 by primary technology provider 308.

In some embodiments, the plurality of bids may be evaluated at the single designated clerking console in real-time with other bids during the live auction event. Single designated clerking console 314 may include relying partner software agent 322. While relying partner software agent 322 is shown to be included within single designated clerking console 314, relying partner software agent 322 may also be accessible via a secure network location. Single designated clerking console 314 may receive a plurality of bids from primary technology provider 308. A single designated clerking operator may be associated with single designated clerking console 322. The single designated clerking operator may evaluate virtual bids received from primary technology provider 308 and live bids from the auction floor simultaneously. Relying partner software agent 322 may monitor interactions between the single designated clerking operator and single designated clerking console 314 via event monitor 324. As live bids are received from the auction floor, the single designated clerking operator may update the current bid for the item via relying partner software agent 322, such that relying partner software agent 322 may be up-to-date in real-time.

Continuing with the example above, after primary technology provider 308 provides 204 single designated clerking console 314 the absentee bid of $500, a bidder on the auction floor may have then bid $600 for the item. As the single designated clerking operator receives the bid of $600 from the bidder on the auction floor, the single designated clerking operator may update the current bid within single designated clerking console 314 via relying partner software agent 322. Relying partner software agent 322 may relay the current bid in a secure electronic message to primary technology provider 308 via message transport 326. Primary technology provider 308 may automatically update the absentee bid to $700 and provide 204 the absentee bid to single designated clerking console 314. Primary technology provider 308 may simultaneously provide 204 the plurality of bids received 200 from the plurality of online bidding communities 302, 304, 306 as the bids processed 202 by primary technology provider 308 during the live auction event. This process may continue until no further bids are received and a final bid is or is not accepted. The final bid may be updated by the single designated clerking operator associated with single designated clerking console 310 via relying partner software agent 322.

In some embodiments, online bidding process 10 may receive 206 an accepted bid from the single designated clerking console. The accepted bid may be received 206 in the form of a secure electronic message by relying partner trust gateway 316 from single designated clerking console 314, including relying partner software agent 322 and message transport 326. The accepted bid may include a monetary value of the accepted bid. Online bidding process 10 may provide the accepted bid from primary technology provider 308 to relying technology providers 310, 312 via relying partner trust gateway 316. Online bidding process 10 may further notify the plurality of bidding communities (e.g., online bidding communities 302, 304, 306) of the accepted bid. In this way, each consumer, either watching or partaking in the live auction event via online bidding communities 302, 304, 306 associated with primary technology provider 308 and relying technology providers 310, 312 may view the accepted bid.

In some embodiments, online bidding process 10 may process, at the primary technology provider, post-sale settlement data associated with the accepted bid. Post-sale settlement data may include, but is not limited to, payment associated with the accepted bid and item, accounting of the item, shipment of the item, invoices, electronic confirmation messages (e.g., e-mail), the tabulation of state and local tax and calculation of percentage-based fees for distribution to any provider involved, etc.

In some embodiments, online bidding process 10 may allow for a single designated clerking operator to be present at a live auction event in order to evaluate each of the plurality of bids from primary technology provider 308. Primary technology provider 308 may receive 200 at least one bid from at least one bidder included within online bidding community 302 associated with primary technology provider 308. Primary technology provider 308 may further receive at least one bid from relying technology providers 310, 312. Relying technology providers 310, 312 may have received the at least one bid from one of online bidding communities 304, 306 associated with relying technology providers 310, 312. In this way, primary technology provider 308 receives 200 each of the plurality of bids, either directly from online bidding community 302 or through relying technology providers 310. Primary technology provider 308 may process 202 each of the plurality of bids. Primary technology provider 308 may then provide 204 each of the processed plurality of bids to single designated clerking console 314. The single designated clerking operator may evaluate the plurality of bids received from primary technology provider 308 simultaneously while receiving bids on the auction floor in real-time during the live auction event. In this way, only a single designated clerking operator need be present at the live auction event to represent each of the plurality of bids received from each of the plurality of online bidding communities (e.g., online bidding communities 302, 304, 306), even if each of the plurality of online bidding communities are using a different discrete online bidding platform hosted by each of primary technology provider 308 and relying technology providers 310, 312.

Accordingly, online bidding process 10 may include a single designated clerking console. This single designated clerking console may be configured to accept bids from multiple bidding communities. Any existing approaches would require the use of additional clerking consoles. As a result, the teachings of the present disclosure, and online bidding process 10 may be configured to address this concern, as well as they many others identified herein.

Figure 4:
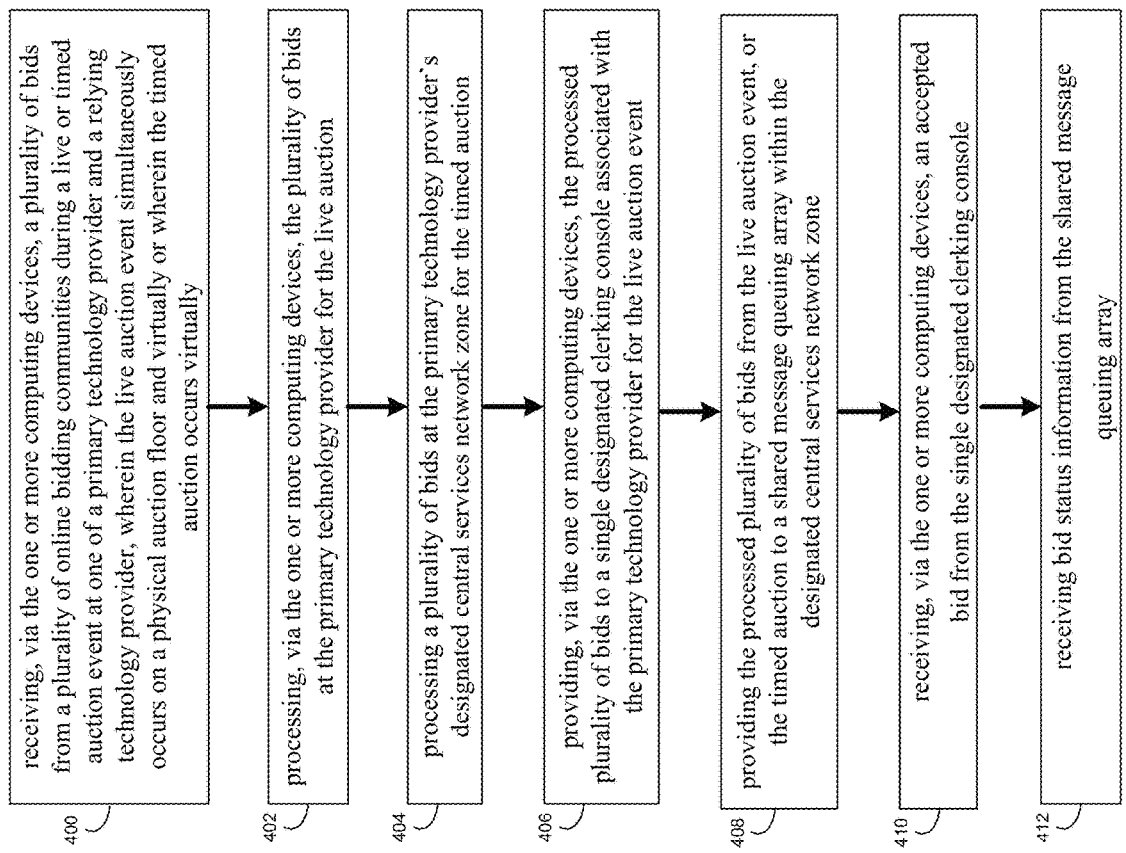
FIG. 4 diagrammatic view of a flowchart depicting operations consistent with an embodiment of the online bidding process of FIG. 1.
Figure 5:
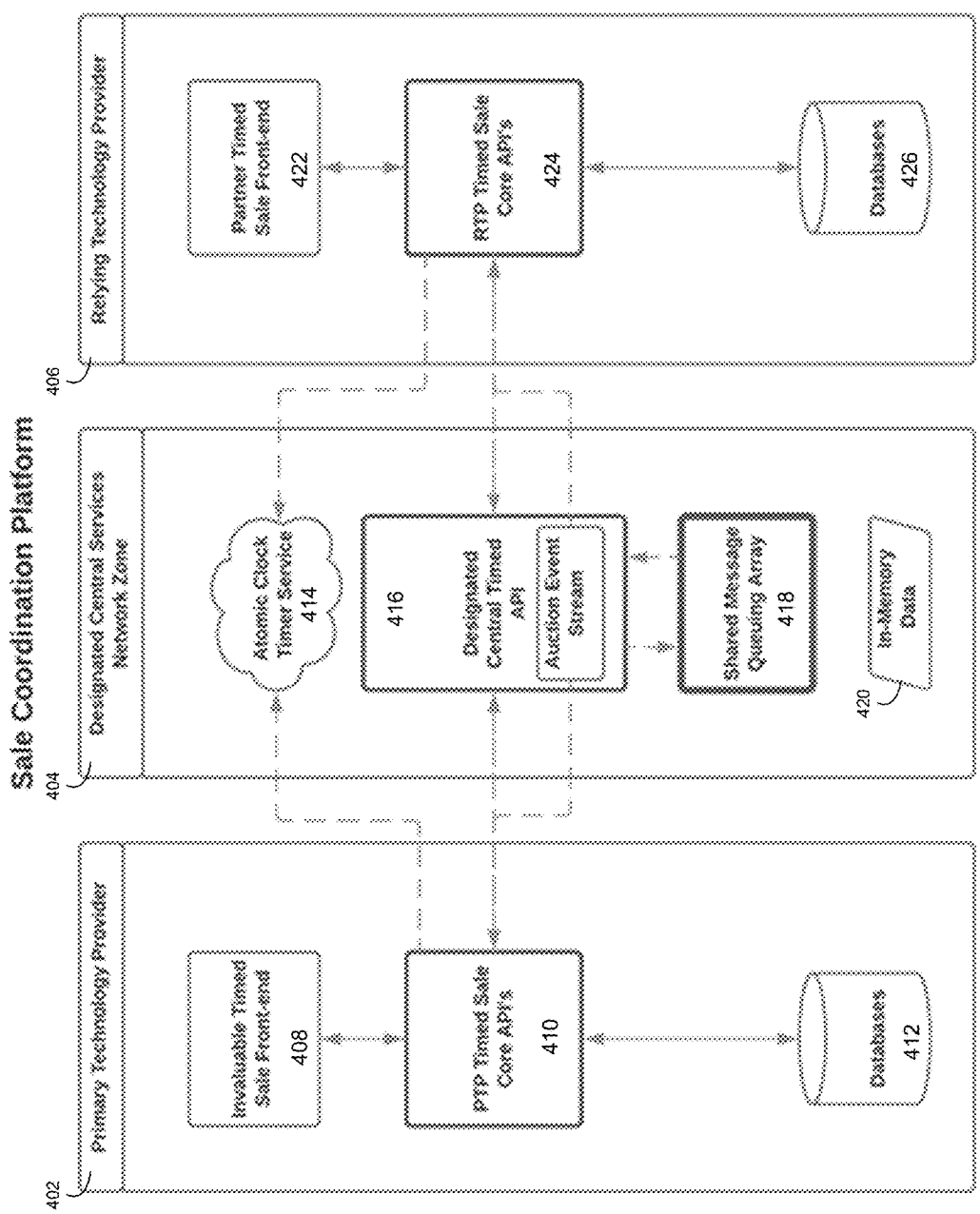
FIG. 5 is a diagrammatic view of a sale coordination platform according to an implementation of the present disclosure.
Figure 6:
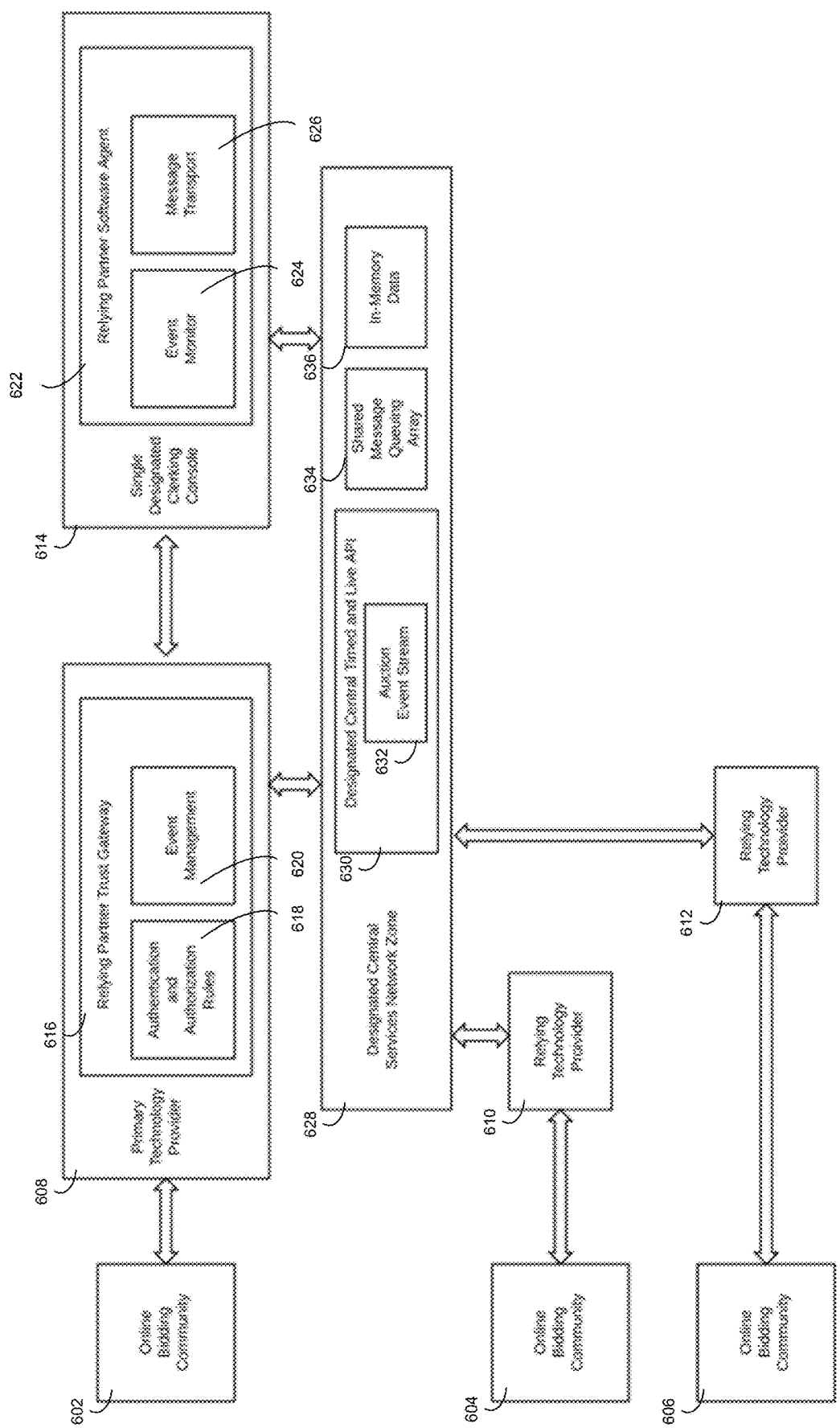
FIG. 6 is a diagrammatic representation of an example online bidding process of FIG. 1, according to an implementation of the present disclosure.

Referring now to FIGS. 4-6, examples consistent with embodiments of online bidding process 10 are provided. As shown in FIGS. 4-6, embodiments included herein may include receiving, via the one or more computing devices, a plurality of bids from a plurality of online bidding communities during a live or timed auction event at one of a primary technology provider and a relying technology provider, wherein the live auction event simultaneously occurs on a physical auction floor and virtually or wherein the timed auction occurs virtually. Embodiments may also include processing, via the one or more computing devices, the plurality of bids at the primary technology provider for the live auction and/or processing a plurality of bids at the primary technology provider's designated central services network zone for the timed auction. Embodiments may further include providing, via the one or more computing devices, the processed plurality of bids to a single designated clerking console associated with the primary technology provider for the live auction event. Embodiments may further include providing the processed plurality of bids from the live auction event, or the timed auction to a shared message queuing array within the designated central services network zone. Embodiments may also include receiving, via the one or more computing devices, an accepted bid from the single designated clerking console and/or receiving bid status information from the shared message queuing array.

As used herein, a "timed auction" may refer to an auction hosted by a technology provider, and facilitate access to a virtual sale event by users who register for the sale by way of a client-side computing device that interacts with a technology provider's servers containing the timed auction event, typically on behalf of a business relationship with an auction house. Timed auctions may be defined and governed by a pre-established sale duration and timeframe; and within that timeframe, bidders are informed by way of a countdown to the eventual conclusion of the timed sale. Once a timed auction starts, and once registration is completed for a prospective bidder, and once a bidder is authorized to bid in the timed auction, an authorized bidder may present an absentee bid [e.g., meaning that the bid may be presented in advance of the timed auction countdown completion]. Prior to countdown completion, authorized users submit one or more bids during the timed auction event for one or more items (or lots): In turn, the asking price for a given lot may be programmatically changed, and typically incremented to reflect the next "asking" price, as defined by an increment table, stored as a static configuration data array, for example, either in an underlying database, defined in a configuration file, or defined programmatically within computer code, etc. The conclusion of a timed auction occurs when the timer countdown reaches zero, at which point, the last and highest bidder to present a bid that was presented and automatically accepted within the allowable timeframe, is deemed the winner of the timed auction item.

In some embodiments, the countdown time may be extended by a fractional time interval based on bid presentation rules, such as having a bid presented within a specified amount of time remaining until the close of the timed auction.

As used herein, the phrase "designated central services network zone" may be provided by the primary technology provider and exists, in network or computing terms, as a DMZ (demilitarized zone); and functions as a means to provide shared, outwardly-facing network and application services to client-side users, relying technology providers, as well as to the primary technology provider, while preventing direct partner and end-user access and interaction with dependent back-end application services and routines. The primary benefit of the Designated Central Services Network Zone is to support multi-partner application functions and data access through an essential software component referred to herein as the Shared Message Queuing Array, which is situated within the Designated Central Services Network Zone.

As used herein, the phrase "shared message queuing array' may refer to an in-memory server application which operates as a message queue that conforms to both publishing and subscription application events. With a coordinated timed auction event, or live auction event, that may be taking place virtually in an instance that is presented by the primary technology provider, as well as any number of relying technology providers, the Shared Message Queuing Array may be the key component that maintains immediate data state changes of all of the respective technology providers that are participating in a coordinated auction (whether it be a timed auction or a live auction). This is made possible by way of an auction event stream. More specifically, the auction event stream resides within the Designated Central Services Network Zone and may be configured within the Shared Message Queuing Array.

As used herein, the phrase "auction event stream" may refer to a unique arrangement of data and application state articles which may be specifically designed to receive instructions related to events and state changes that any number of live or timed auction sale instances may generate. The auction event stream may be read and updated by all coordinated technology providers for a given sale with information related to bid increments, bidding activity results, and countdown timer information; in addition to having all of the necessary information about the sale itself, the items for sale within a given live auction or timed auction; and with references to partner and bidder identifiers by all dependent technology partners. In the case of a live auction, the auction event stream may be the single designated application gateway for a plurality of bids from a plurality of bidding communities to be sent onward to a single designated clerking console; and in the case of a timed auction, the auction event stream serves as the single designated application gateway for a plurality of bids from a plurality of bidding communities to be evaluated and automatically processed, without the need for a human-operated clerking console.

In some embodiments, data necessary for a live or timed sale to exist may originate at either the primary technology provider 402, or may originate at a relying technology provider 406, and may be stored in a database 412 at the primary technology provider 402; or at a database 426 maintained by a relying technology provider 406. Related information may be provided by an atomic clock timer service 414 located in a designated central services network zone 404, which may be required in order to serve as a universal time source for the purposes of allowing the systems involved to start sales in unison, or in order to track the remaining countdown times which are a necessary component of a timed auction format, to ensure coterminous operation for the duration of activities and recorded events. Once instantiated, sale information from a primary technology provider 402 or a relying technology provider 406 is propagated to the designated central timed API 416 with the designated central services network zone 404 by way of their respective timed sale core API's 410, 424. Sale information and corresponding events and actions that are received into the designated central timed API 416 are processed by the shared message queuing array 418, which is designed to guarantee the receipt, delivery and ordering of information, and is not limited to spawning event listeners, providing additional information to API callers, from a primary technology provider 402, or a relying technology provider 406. In some cases in-memory data 420 is maintained and utilized by various components within 404 the designated central services network zone in order to provide low-latency access for metadata and session related information that is necessary to provide data context about auction events, the bidding community users that are interacting with auction events by way of partner timed sale front-end 422 and invaluable timed sale front-end 408, or any other number of relying technology partners. The primary technology provider 402 and relying technology provider's 406 respective timed sale front-end 408, 422 interfaces are directly populated with all necessary timed or live auction information by the designated central timed API's auction event stream 416. The auction event stream 416 serves as a distributed and unified source of up to the second live or timed auction sale information across all online bidding communities 602, 604, 606 and primary technology provider 608 and relying technology providers 610, 612 with which the online bidding communities 602, 604, 606 may interact on behalf of the primary technology provider 608, and any number of relying technology providers 610, 612. The services auction even stream 632, shared message queuing array 634, and in-memory data 636 within the designated central services network zone 628 may communicate with services located at the primary technology provider 608 by way of the designated central timed and live API 630 in order to fulfil transactional prerequisites before utilizing services and functions located within the designated central network zone 628. The primary technology provider's 608 services within the relying partner trust gateway 616 are designed to handle requests on behalf of the designated central timed and live API 630, making use of the authentication and authorization rules 618 as a master repository of services that relate to permissions for auction functions that are defined within the event management 620 service to evaluate whether a given technology provider 610, 612 is permitted to utilize the services within the designated central services network zone 628, as well as to determine whether access is permitted for services hosted by the primary technology provider 608, including access by the single designated clerking console 614, and access by relying technology providers 610, 612 for the purposes of hosting a multichannel coterminous live or timed auction. The functions provided within the designated central services network zone 628 may also together organize and structure events so that live auction events from a plurality of online bidding communities 602, 604, 606 and technology providers 608, 610, 612 may interact with; in the case of a timed auction, the designated central timed and live API; as well as in the case of a live auction, where a plurality of online bidding communities and technology providers may interact with the single designated clerking console's 614 event monitor 624 and message transport 626 within the relying partner software agent 622.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method, executing on one or more computing devices, comprising:
 receiving, via the one or more computing devices, a plurality of bids from a plurality of online bidding communities during a live or timed auction event at one of a primary technology provider and a relying technology provider, wherein the live auction event simultaneously occurs on a physical auction floor and virtually or wherein the timed auction occurs virtually;
 processing, via the one or more computing devices, the plurality of bids at the primary technology provider for the live auction;
 processing a plurality of bids at the primary technology provider's designated central services network zone for the timed auction;
 providing, via the one or more computing devices, the processed plurality of bids to a single designated clerking console associated with the primary technology provider for the live auction event;
 providing the processed plurality of bids from the live auction event, or the timed auction to a shared message queuing array within the designated central services network zone;
 receiving, via the one or more computing devices, an accepted bid from the single designated clerking console; and
 receiving bid status information from the shared message queuing array.

2. The computer-implemented method of claim 1, further including:
 if at least one bid of the plurality of bids is received at the relying technology provider from at least one bidder of the plurality of online bidding communities, receiving, at the primary technology provider, the at least one bid from the relying technology provider.

3. The computer-implemented method of claim 1, further including:
receiving, at one of the primary technology provider and the relying technology provider, an absentee bid from at least one bidder of the plurality of online bidding communities prior to the live auction event.

4. The computer-implemented method of claim 3, wherein the absentee bid includes a maximum bid.

5. The computer-implemented method of claim 3, further including:
providing the absentee bid to the single designated clerking console for the live auction event.

6. The computer-implemented method of claim 1, wherein the primary technology provider includes a relying partner trust gateway to authenticate communication from the relying technology provider and provide communication to the relying technology provider.

7. The computer-implemented method of claim 1, wherein the plurality of bids are evaluated at the single designated clerking console in real-time with other bids during the live auction event.

8. The computer-implemented method of claim 1 further including:
providing the accepted bid from the primary technology provider to the relying technology provider.

9. The computer-implemented method of claim 1, further including:
notifying the plurality of bidding communities of the accepted bid.

10. The computer-implemented method of claim 1, further including:
processing, at the primary technology provider, post-sale settlement data associated with the accepted bid.

11. A computer program product residing on a non-transitory computer readable storage medium having a plurality of instructions stored thereon, which when executed by a processor, cause the processor to perform operations comprising:
receiving, via the one or more computing devices, a plurality of bids from a plurality of online bidding communities during a live or timed auction event at one of a primary technology provider and a relying technology provider, wherein the live auction event simultaneously occurs on a physical auction floor and virtually or wherein the timed auction occurs virtually;
processing, via the one or more computing devices, the plurality of bids at the primary technology provider for the live auction;
processing a plurality of bids at the primary technology provider's designated central services network zone for the timed auction;
providing, via the one or more computing devices, the processed plurality of bids to a single designated clerking console associated with the primary technology provider for the live auction event;
providing the processed plurality of bids from the live auction event, or the timed auction to a shared message queuing array within the designated central services network zone;
receiving, via the one or more computing devices, an accepted bid from the single designated clerking console; and
receiving bid status information from the shared message queuing array.

12. The computer program product of claim 11, further including:
if at least one bid of the plurality of bids is received at the relying technology provider from at least one bidder of the plurality of online bidding communities, receiving, at the primary technology provider, the at least one bid from the relying technology provider.

13. The computer program product of claim 11, further including:
receiving, at one of the primary technology provider and the relying technology provider, an absentee bid from at least one bidder of the plurality of online bidding communities prior to the live auction event.

14. The computer program product of claim 13, wherein the absentee bid includes a maximum bid.

15. The computer program product of claim 13, further including:
providing the absentee bid to the single designated clerking console for the live auction event.

16. The computer program product of claim 11, wherein the primary technology provider includes a relying partner trust gateway to authenticate communication from the relying technology provider and provide communication to the relying technology provider.

17. The computer program product of claim 11, wherein the plurality of bids are evaluated at the single designated clerking console in real-time with other bids during the live auction event.

18. The computer program product of claim 11 further including:
providing the accepted bid from the primary technology provider to the relying technology provider.

19. The computer program product of claim 11, further including:
notifying the plurality of bidding communities of the accepted bid.

20. The computer program product of claim 11, further including:
processing, at the primary technology provider, post-sale settlement data associated with the accepted bid.

* * * * *